Patented May 11, 1937

2,080,009

UNITED STATES PATENT OFFICE 2,080,009

PLASTER WALLBOARD AND METHOD OF MAKING IT

Carlisle K. Roos, Fort Dodge, Iowa, assignor to United States Gypsum Company, Chicago, Ill., a corporation of Illinois No Drawing. Original application January 19, 1925, Serial No. 3,477, which is a continuation of application Serial No. 733,197, August 20, 1924. Divided and this application October 16, 1926, Serial No. 142,155

18 Claims. (Cl. 154—2)

This invention relates to improvements in building material and more particularly to the production of cementitious material of a porous or cellular structure which is obtained by the use of confined gas as an aggregate, rather than gas as an expansive force to distend the volume of the cementitious material during the setting process.

Cementitious material and particularly calcined gypsum has been employed for years as a finishing coat or covering for the interior walls of buildings, and has been molded into blocks to form partitions and tiles to form roofs and floors, it has also been employed as a filler in poured roofs and floors and as a core for plaster board and plaster wall board, as well as having been employed in other forms and articles. Calcined gypsum on account of its non-conductive and fire resisting qualities has been a desirable product for the purposes above described. In wall coverings the calcined gypsum has been used with sand as an aggregate to give it body for the first coats and a retarder to delay the setting so that it may be properly applied and in other cases fibre or sawdust has been added as an aggregate in lieu of the heavy sand aggregate which reduces the weight of the finished product. In the formation of roofs, floors, tile, block and plaster board or wallboard the addition of fiber or sawdust aggregate detracts from its fire resisting quality which is as desirable in these products as decreasing the weight of the finished product.

To overcome this objection and produce such articles of calcined gypsum in which the weight is greatly reduced and in which the articles possess the qualities of unadulterated set gypsum, certain chemicals or minerals have sometimes been added to the dry calcined gypsum which will upon the addition of water evolve a gas causing the mixture to puff out or expand in volume and upon the setting of the gypsum will form a porous or cellular body so that the articles thus produced will be of less weight per volume and be as fire resisting and better insulating mediums than unadultered set gypsum.

It is an object of this invention to produce a porous or cellular body of set calcined gypsum without the use or addition of chemical gas evolving agents to the gypsum which react with the water to form an expanded plastic mass to be molded or otherwise formed into the required shape of the article desired. To this end an inert foam is formed comprising a plurality of minute bubbles of air the enveloping films of which are so individual in mass form that these air cells are in effect an aggregate and then as the calcined gypsum is being mixed with water, in the same manner as ordinarily employed to form the desired article, such inert aggregate of minut air bubbles is thoroughly incorporated in the plastic mass during the mixing process.

The incorporation of the air or gas aggregate has the same effect upon reducing the density of the plastic mass as any other aggregate lighter in weight than the cementitious material itself and reduces density of the entire mass to give lighter weight per unit volume. Because the air or gas is so much lighter in weight than any solid aggregate the reduction in unit volume weights is correspondingly much greater and due to the fact that the air or gas is so thoroughly confined in such a tough film of a suitable film forming substance, the air or gas will remain confined during the mixing process of cementitious solid and water and thus permit of the novel aggregate being incorporated therein. Any amount of porosity or cellular structure desired can be produced and a definite size of porosity can be maintained, because the tough filmed bubbles of air or gas maintain their identity until the gypsum has set, and the tough film envelope of the confined air or gas aggregate is replaced by a permanent set wall of cementitious material with the air or gas still confined.

This application is a division of my application for Cementitious material, Serial No. 3,477, filed January 19, 1925, which is a continuation of my prior application Serial No. 733,197 filed August 20, 1924 (now U. S. Patent No. 2,017,022), which latter describes broadly the application of this principle of reducing the weight of articles made from cementitious material by the incorporation of a foam of minute air bubbles in the plastic mass and specifically describes the reinforcing of the air bubble enveloping films before the foam is mixed with the plastic mass. Patent No. 2,017,022 describes the foam as having a fine grained form and stabilized to such an extent that the foam might be preserved indefinitely. It also states that other reagents such as gelatin, dextrin and gum arabic added to the foam will reinforce the walls of the bubbles and produce a preservative effect.

In the formation of articles produced in accordance with the invention described in Patent No. 2,017,022 which are dried or set in the open air a foam of air bubbles suitably stabilized is desirable. In the formation of plaster board and other articles subjected to the heat of a drying kiln, a foam with air bubbles stabilized by organic agents is desirable. In articles where no external pressure is applied, the air bubble walls may be readily reinforced as specifically described in my said patent by calcined gypsum or other inorganic agent which will harden and produce a rigid and more or less fragile wall, and foam bubbles so stabilized will act satisfactorily in such articles but where external pressure is applied to air bubble foam and cementitious material mixture the best result is obtained by a foam in which the walls of the air bubbles are rendered tough and pliable.

In applying this invention to the manufacture of plaster wallboard such as made on a continuous machine like that described in the Utzman Patent 1,330,413, February 10, 1920, and afterwards dried in a drying kiln the foam is produced and then deposited upon the mixing belt where the calcined gypsum and water are mixed by the mixing fingers to form a homogeneous mass to be deposited upon the bottom cover sheet of the wallboard as it advances thereunder. It is seen that the addition of an inert foam at this step in the process of making wallboard is treating the foam in the same manner as any other aggregate that may be desired to be incorporated in the body of the core of the wallboard. In the course of formation of plaster wallboard on machines similar to the above referred to Utzman patent the plastic mass deposited on the bottom cover sheet is advanced between pressure rolls as the top cover sheet is applied, the pressure so applied to the plastic mass collecting in front of the rolls spreads it out to form a core between the top and bottom cover sheets of even thickness between the edges.

In such an application of this invention the first step is to prepare a solution capable of being converted into a foam by agitation. There are several types of reagents which will produce such a foaming solution or mixture such as solutions, mixtures, or emulsions of flotation oils, various organic compounds similar to soap, saponin, soap bark, albumens, licorice, etc. The efficacy of the above mentioned reagents of course varies considerably and it has been found that a water solution containing up to three percent of powdered soap bark produces satisfactory results. Such a solution of soap bark and water may be agitated or converted into a foam in the same manner as eggs or cream.

Immediately after the formation of satisfactory foam a relatively small quantity of gelatin, dextrin, gum arabic or other organic colloid such as rice flour or other farinaceous paste is added and stirred into the foam thoroughly. The addition of this colloidal agent will reinforce the film enveloping the air bubbles so that each bubble will have tough and pliable walls and enable the bubbles to form an aggregate that may be substituted for solid aggregate. The thus stabilized foam is then deposited on the mixing belt of the machine and stirred into the mixture of water and calcined gypsum thereon by the mixing fingers until the whole is a homogeneous mass as it is deposited on the advancing covering sheet. The walls of the air bubbles incorporated in the plastic mass being tough and pliable not only remain intact during the mixing with the cementitious material and water but are not broken or changed in volume and the aggregate formation is maintained in passing through the pressure rolls as the board is formed. The quantity of foam incorporated into the wet mass on the mixing belt will of course determine its cellular structure, and this in turn determines the bulk and weight of the finished product. The wallboards so formed are quickly dried by passing through a drying kiln as they are removed from the discharge end of the machine.

In such an application of this invention the foam is continuously formed, stabilized and immediately incorporated into the plastic core material which is continuously deposited on the continuously moving cover sheet and immediately passed through the pressure rolls and the board so formed continuously cut and removed from the machine and immediately entered into the drying kilns from which it emerges the finished product so that but little time is consumed from the initial stabilization of the air bubble walls to the completion of the finished product and the toughness and pliability of the air bubble walls is of more importance and more necessary to such an article than the permanency of the preservatives of the air bubbles formation as is required in a slow setting article.

What I claim is:

1. The process of producing cellular cementitious products which comprises making a fine-grained foam from a solution containing foam-producing agents, thereupon stabilizing said formed foam by the addition of organic colloidal stabilizing agents, then adding said stabilized foam to a slurry of gauging fluid and cementitious substance, and then molding the resultant mixture.

2. The process of producing cellular cementitious products which comprises whipping a comparatively freely fluid solution containing a foaming agent into a fine-grained foam, adding to said foam a soluble organic colloid capable of stabilizing said foam, adding the thus stabilized foam to a slurry of gauging fluid and cementitious substance, and molding the resultant mixture.

3. The process of producing a plasterboard having a cellular core which comprises whipping a comparatively freely fluid solution of a foaming agent into a fine-grained foam, adding to said foam a water soluble organic colloid capable of stabilizing said foam and of rendering the walls of the air bubbles of said foam resistant to crushing by pressure, gauging calcined gypsum with water, adding aforesaid stabilized foam to the gauged gypsum, passing the thus prepared mixture through a plasterboard machine, allowing the gypsum to set, and drying the resulting plasterboards.

4. The process of making cellular insulating material comprising aerating a starch paste, mixing finely divided calcined gypsum with water to hydrate the same, uniformly mixing the aerated starch with the gypsum slurry, bringing the mass into the desired shape and drying the same.

5. The process of making insulating material which comprises incorporating a foam into a starch paste, adding water to finely divided calcined gypsum, intimately mixing the foam-containing starch with the gypsum slurry, giving the mass the desired form and drying the same.

6. In the process of making insulating material the step which comprises incorporating an aerated starch in a gypsum slurry.

7. The process of making wall board which comprises mixing a dense foam with a starch paste to expand the latter and form cells therein, adding the mixture to a slurry of calcined gypsum, placing the mass between sheet liners and drying the same.

8. The process of making wall board which comprises forming a dense foam, uniformly mixing the same with a starch paste to expand the latter and form cells therein, adding water to finely divided calcined gypsum in quantity sufficient to hydrate the same and before the latter begins to set intimately incorporating the starch-foam mixture therein, placing the mass between paper liners and drying the same.

9. The process of making insulating material comprising emulsifying a starch paste with air, mixing the starch emulsion with a slurry of gypsum, giving the mass the desired form and drying the same.

10. A plaster board having a porous body comprising a hardened cementitious material enclosing a plurality of voids encased in tough pliable films.

11. A plaster board having a light weight porous body of hardened cementitious material enclosing a plurality of minute voids each enveloped in a tough pliable colloidal casing.

12. The process of producing a plaster board having a porous body comprising the formation of an aggregate of minute gas cells encased in tough pliable envelopes, adding the aggregate to calcined gypsum and water, thoroughly mixing therewith, passing the homogeneous mixture through a plaster board machine and removing the moisture from the plaster boards so formed.

13. The process of manufacturing plaster boards having a porous body comprising the production of fine grained gaseous aggregate consisting of minute colloidal film encased individual bubbles, incorporating the aggregate in the plastic body material, passing the mixture through a plaster board machine and allowing the plaster boards so formed to harden, the tough pliable casings of the bubbles maintaining their individuality during the process.

14. A wallboard comprising a porous body of hardened cellular cementitious material enclosing a plurality of voids encased in tough pliable films, and cover sheets between which said cementitious material is interposed.

15. A wallboard comprising a porous body of hardened cellular cementitious material enclosing a plurality of voids encased in tough pliable films, and cover sheets between which said cementitious material is interposed and to which said cover sheets are bonded.

16. A wallboard comprising a porous body of hardened cellular cementitious material enclosing a plurality of voids encased in tough pliable films, and cover sheets applied to said cellular cementitious material while in a plastic condition and to which said cover sheets are bonded when the plastic cementitious material hardens.

17. A wallboard comprising a porous body of hardened cellular cementitious material enclosing a plurality of voids encased in tough pliable films, and cover sheets therefor which are applied by means of pressure when said cementitious material is in a plastic state whereupon said cover sheets remain bonded to said cementitious material after the same has set and hardened.

18. The process of manufacturing wallboard having a cellular cementitious core which comprises the production of a fine grained foam consisting of a plurality of voids encased in tough pliable films, incorporating said foam in the cementitious material in a plastic state, passing the mixture through a plasterboard machine whereupon cover sheets are applied to said mixture through the application of pressure, and allowing the same to harden whereby the cover sheets become bonded to the cementitious cellular core and the tough pliable casings of the bubbles maintain their individuality.

CARLISLE K. ROOS.